UNITED STATES PATENT OFFICE 2,528,008

FOOD PRODUCTS AND METHOD OF MAKING SAME

Louis La Vine, Los Angeles, Calif.

No Drawing. Application December 17, 1948,
Serial No. 65,970

14 Claims. (Cl. 99—192)

My invention relates to food products and method of making same, particularly frozen foods coated or impregnated with a solution of calcium polysulfide or the products derived therefrom upon dilution thereof, and its objects are to preserve food by freezing and to afford protection of such food from putrefaction, decomposition and decay not only while frozen but also for a substantial period after thawing or defrosting has taken place; to utilize in such form of frozen preservation a form of sulfur solution which, while aiding such preservation, is without harmful effects upon consumers of the food so preserved, and to dispense with the use of the fumes of burning sulfur or sulfurous acid or other pernicious forms of sulfur used as preservatives; to destroy or render ineffective in such food bacteria or spores thereof which tend to produce deterioration and decay, and generally to bring about a form of food preservation which is of longer duration and more effective than has heretofore been accomplished. Other advantages and objects of my invention will appear as hereinafter set forth.

The present application is a continuation in part of my earlier copending abandoned application Serial No. 586,448, filed April 3, 1945, and entitled "Food Products and Method of Making Same," and I reserve such earlier date for all common subject matter set forth in said applications, and claimed herein.

In the preservation of food by refrigeration or through the use of chemicals, the main object is to avoid decomposition caused by development within the food of living organisms, coming from the air, the soil or from animal sources. The problem is that of keeping away, killing off or rendering ineffective such organisms so that the food may remain fit for human consumption. For this purpose, refrigeration is generally used, but it is recognized that while freezing temperatures tend to destroy some of the organisms, most bacteria and spores thereof present in the food remain dormant, and will become active again at normal atmospheric temperatures. Chemicals are also used as food preservatives such as vapors of formaldehyde, salicylic and benzoic acids, sulfurous acid and sulphites; but it has been found that all of these substances possess injurious physiological properties. In my improved process, however, I have succeeded in combining the advantages of quick freezing and proper refrigeration with the preservative and curative value of sulfur without any deleterious consequences resulting therefrom. I have discovered that while refrigeration is generally satisfactory as a preservative for food so long as freezing temperatures are maintained, nevertheless after frozen food is once thawed out and exposed to the air, decomposition tends to set in much more rapidly than is the case when it is in its original sound and eatable condition. In such case I have found that where such food is, prior to freezing, coated or impregnated with a solution of calcium polysulfide or the products formed from calcium polysulfide on dilution, including calcium hydrosulfide and colloidal sulfur, decomposition after thawing is greatly delayed or in large part avoided, without diminishing the value of such food.

Ordinary commercial sulfur has been found unsatisfactory for the preservation of food. As now used for preventing the discoloration of fruits and bacteriological changes therein, it is common practice in the commercial drying of such fruits to expose the same to the fumes of burning sulfur, forming sulfur dioxide, and a thin layer of sulfurous acid is allowed to form upon the moist surfaces of the fruit.

It is recognized that to obtain maximum preservative action from sulfur dioxide, it is necessary to have both rapid and thorough penetration thereof into the tissues of the fruit. Nevertheless, since sulfur dioxide remaining in the fruit in appreciable quantities is harmful to the human system when eaten, it must be removed therefrom, or reduced to a very low concentration before the fruit is consumed.

In the exercise of my invention, however, I disregard the use of sulfur dioxide, and preferably employ instead a five per cent solution of calcium polysulfide, diluted in water in the proportion of one part of such solution to fifteen hundred parts of water; which solution is preferably prepared by mixing one part by weight of solid calcium sulfide with two parts by weight of powdered sulfur in enough water to form a heavy milky suspension, and then boiling the mixture until no further evidence of solution is observed. The excess sulfur remaining may thereupon be removed by filtration while hot, and the resulting concentrate adjusted to the desired five per cent concentration by the addition of water. Concentration, however, other than such five per cent and dilution ratios other than one to fifteen hundred may be used, as hereinafter set forth When diluted the calcium polysulfide liberates colloidal sulfur and forms calcium hydrosulfide. The addition of this sulphur solution diluted as aforesaid to the frozen food not only acts as a preservative, but also adds an important mineral element that greatly improves the nutritional and therapeutic value of the food. That is, the calcium polysulfide so used, acts not only as an antiseptic or germicide preventing decay, but also incorporates within the food itself an element which is beneficial in the nutrition and growth of the human body itself; this form of sulfur being of value in regulating nerve impulses, in promoting secretions, and in producing natural oxidation and combustion, and being used by all the organs of the human body.

In recent years one method of refrigeration known as the "quick freezing process" has come into common use by food distributors as a method found to be very effective in retaining the natural flavors of food while at the same time avoiding discoloration thereof and arresting decomposition and decay. This process has been found to be particularly satisfactory in the case of fruits and vegetables, although it may be applied to almost any kind of food with good results. As now generally carried on in respect to fruits and vegetables, they are first weighed and washed; and upon thorough inspection, separated into desired sizes, graded according to size and color, and the decayed, ill-formed, discolored and otherwise undesirable individual fruits or vegetables culled out. Sometimes salt is now or later added, as in the case of lima beans, string beans, peas, lentils or other food. Then the remaining fruits or vegetables are quickly steamed or blanched in the attempt to destroy the enzymes which are claimed by some authorities to be the cause of decay, and also for the purpose of holding color and partially cooking the food. Thereupon the entire mass is salted if desired, packaged and quickly frozen. With berries and similar fruit, salt is not ordinarily used. Sometimes hot lye dip is used for removing the skins from the fruit, especially with peaches or apricots; and with tomatoes, a hot water dip may be employed for removing the skins; the purpose being to render such food immediately available for human consumption upon being defrosted. With green leafy vegetables, leaves which do not come up to standard are culled out; and such vegetables may also be blanched to preserve color and prevent decay—after which they are sized off and quickly frozen. The disadvantage with all of these freezing processes, with the possible exception of the objectionable use of the fumes of burning sulfur for fruit, is that immediately upon becoming defrosted and exposed to the air, the food becomes oxidized, and if such exposure is continued the food will suffer discoloration, become decayed, and decomposition is likely quickly to set in.

With the exception of the use of calcium polysulfide and other steps hereinafter set forth, my improved process follows in large part the quick freezing process above set forth. As in the prior process, I preferably first weigh, wash, sort and cull any fruit or vegetables to be subjected thereto, but such steps if desired may be taken later after sulphur treatment. Then I carefully dip such fruits or vegetables into a liquid composition obtained by diluting my aforesaid five per cent solution of calcium polysulfide in water in the proportion of one part of said solution to fifteen hundred parts of water by weight. Such proportions could be varied, however, according to the particular fruit, vegetables or other food treated, so as to employ a one to ten per cent solution of calcium polysulfide dissolved in water in the proportion of one part of such solution to one thousand to two thousand parts of water; the temperature of the water being preferably from 50 to 72 degrees Fahrenheit. The fruits or vegetables, prepared as aforesaid, are immersed in this composition from fifteen to thirty minutes, or long enough to remove any bacteria or mold from the exterior surface of said fruits and vegetables, to thoroughly coat, and in some cases to impregnate, the same. This dipping may take place in the field or in a processing plant. After this, if not already attended to, the separation of culls and the grading of the stock may be done. Thereupon, if steaming, cooking or blanching is desired, such steps can be accomplished. Then, these matters having been taken care of, the fruits and vegetables so treated are preferably dipped again a second time and kept from five to twenty minutes in a composition of calcium polysulfide of approximately twice the strength of the diluted composition above referred to, until such stock is somewhat impregnated or saturated with such stronger composition. Now, if desired, salt or other seasoning may be added. Then, the mass is packaged, and quickly frozen, following the final step of the prior process.

When my improved process is used for preserving fish, fowl or meat, the same steps as above set forth for fruit or vegetables may be used. Freezing may be dispensed with in the case of smoked food, it being necessary, however, in such situation to use a more concentrated solution of the calcium polysulfide for both the first and second dippings, preferably two to three times as strong a solution in order to obtain the best results.

By the words "calcium polysulfide" as used in the claims, I desire to be understood as restricting the meaning thereof to a composition of such character that when diluted liberates colloidal sulphur and forms calcium hydrosulphide, a sulphur solution that is capable of acting as a preservative for foods when coating or impregnating the same; all of which is without harmful effects to the consumer of the food so preserved, and which incorporates within the food itself elements that improve the nutritional and therapeutic value thereof and are beneficial to the health of said consumer.

My invention may be carried out in other ways or embodied in other forms without departing from the spirit or essential characteristics thereof, the scope of my invention being indicated by the appended claims rather than by the foregoing description, and all changes which come within the meaning and range of equivalency in the claims are therefore intended to be embraced therein.

What I claim and desire to secure by Letters Patent is:

1. A method of preserving food, consisting in coating the food with a solution of calcium polysulfide, and then refrigerating the same.

2. A method of preserving food, consisting in impregnating the food with a solution of calcium polysulfide, and then freezing the same.

3. A method of preserving food, consisting in coating and impregnating the food with a solution of calcium polysulfide, and then freezing the same.

4. A method of preserving food, consisting in soaking the food to saturation in water having dissolved therein a solution of calcium polysulfide, and then freezing the same.

5. A method of preserving food, consisting in soaking the same for approximately from fifteen to twenty minutes in water containing a solution of calcium polysulfide, and then freezing the food so treated.

6. A method of preserving food, consisting in soaking the same from fifteen to twenty minutes in water diluted with a five per cent solution of calcium polysulfide, and thereafter freezing the food so treated.

7. A method of preserving food, consisting in soaking the same from fifteen to twenty minutes at a temperature from fifty to seventy degrees Fahrenheit in water diluted with a five per cent solution of calcium polysulfide, and thereafter freezing the food so treated.

8. A method of preserving food, consisting in soaking the same in water having dissolved therein a solution of calcium polysulfide, then cooking the food so treated, and again soaking the same in water having dissolved therein a similar solution of polysulfide but of greater strength than the first solution, and thereafter quickly freezing said food.

9. A method of preserving food, consisting in soaking the food in a solution of calcium polysulfide and thereafter smoking the same.

10. A method of preserving food, consisting in soaking the food in a solution of calcium polysulfide, then smoking the food so treated and thereafter quickly freezing the food.

11. A food product comprising frozen food treated with a solution of calcium polysulfide.

12. A food product comprising frozen food treated with a solution of calcium polysulfide, containing the products formed therefrom on dilution, including calcium hydrosulfide and colloidal sulfur.

13. A food product comprising frozen food treated with a five per cent solution of calcium polysulfide.

14. A food product comprising frozen food containing the products formed by treating the same with a diluted five per cent solution of calcium polysulfide.

LOUIS LA VINE.

REFERENCES CITED

The following references are of record in the file of this patent:

UNITED STATES PATENTS

| Number | Name | Date |
| --- | --- | --- |
| 2,419,877 | Birdseye | Apr. 29, 1947 |